(No Model.)
F. J. WEIS.
DRIVING MECHANISM FOR CARS.
No. 398,208. Patented Feb. 19, 1889.
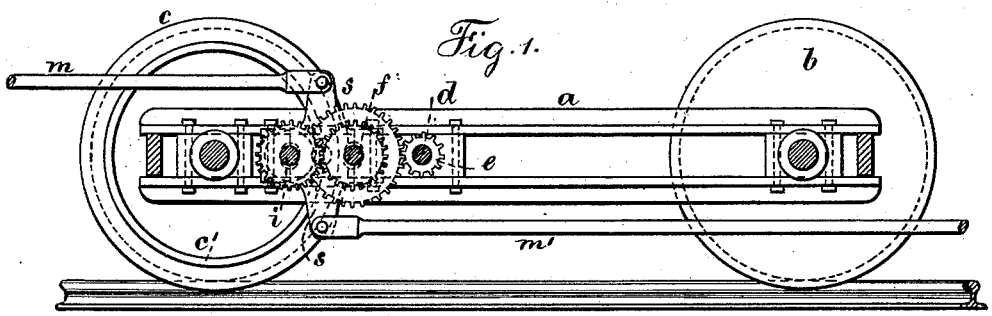
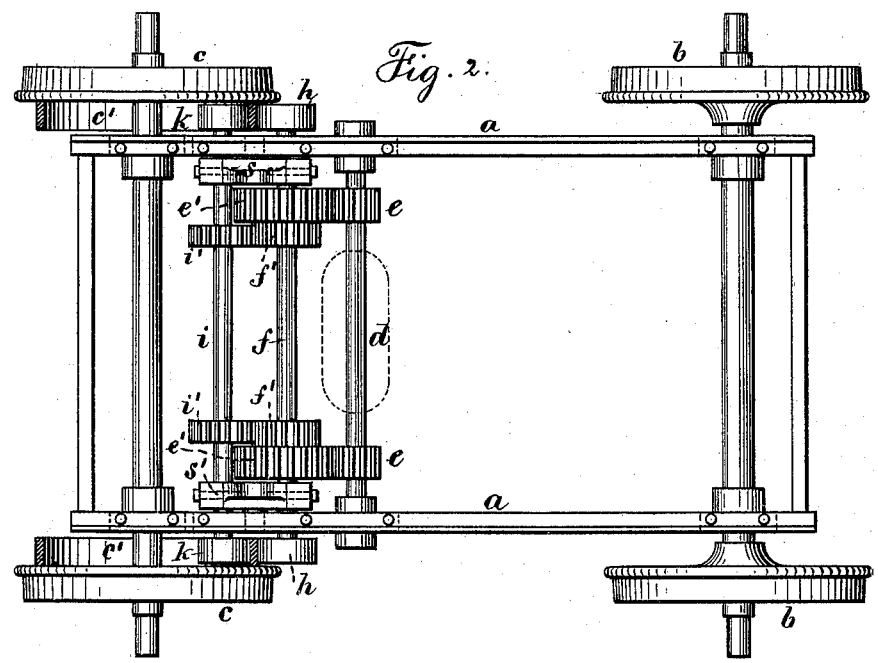
Witnesses:
J. Staib
Chas. H. Smith
Inventor:
Francis J. Weis
per Lemuel W. Serrell Atty.

UNITED STATES PATENT OFFICE.

FRANCIS J. WEIS, OF JERSEY CITY, NEW JERSEY, ASSIGNOR TO THE UNITED STATES MACHINE COMPANY, OF SAME PLACE.

DRIVING MECHANISM FOR CARS.

SPECIFICATION forming part of Letters Patent No. 398,208, dated February 19, 1889.

Application filed June 28, 1888. Serial No. 278,439. (No model.)

*To all whom it may concern:*

Be it known that I, FRANCIS J. WEIS, of Jersey City, in the county of Hudson and State of New Jersey, have invented an Improvement in Driving Mechanism for Cars; and the following is declared to be a description of the same.

My present invention relates to improvements in car-motors dependent on electricity as a motive power, and said improvements are connected with and relate to the devices described and claimed in the application of Joseph Weis filed July 19, 1887, Serial No. 244,707, which application was duly allowed February 3, 1888.

The devices constituting my present invention are applicable to cars driven by an electric motor, the electric current for operating the motor being derived from any well-known or desired source of supply; and my invention consists in the combination, with the main supporting-frame for the car-body and driving and supporting wheels, of friction-wheels bearing upon annular flanges and operated by a hand-lever system to engage or disengage said friction-wheels and flanges to drive or stop the car. One pair of said friction-wheels engages the outer surface of the annular flanges and the other pair of said friction-wheels engages the inner surface, so that between the friction-wheels there is simply a thickness of the flange, and the shafts of said friction-wheels are mounted in bearings formed in rocking frames, and upon said shafts are gears meshing with one another and operated by gears upon the electrically-rotated or motor shaft, and said rocking frames are operated by a hand-lever system from either end of the car.

In the drawings, Figure 1 is a sectional elevation of the wheels and gear through the shafts of the respective parts, and Fig. 2 is a plan of the same.

The frame $a$ is adapted to carry in any desired manner the car-body, and the pair of wheels $b$ are mounted in bearings at one end of said frame, and the pair of wheels $c$ are mounted in bearings connected to the other end of the frame $a$, and each of said wheels $c$ is made with an annular flange, $c'$, upon its inner side, which flanges are of smaller diameter than the tread of the wheels.

$d$ represents the electrically-rotated or motor shaft, the armature of which motor is shown by dotted lines, and said shaft $d$ has end bearings in the frame $a$, and there are gear-wheels $e$ near the respective ends of said shaft $d$.

The shafts $f$ and $i$ are supported in bearings in the rocking frames $s$ $s'$. Said rocking frames have short central shafts in bearings connected to the frame $a$, and the shafts $f$ and $i$ pass through between the parts of the frame $a$, and upon their outer ends are the pairs of friction-wheels $h$ and $k$, the pair of friction-wheels $h$ being adapted to engage the outer surface of the flanges $c'$ and the pair of friction-wheels $k$ adapted to engage the inner surface of the flanges $c'$, the friction-wheels $h$ being slightly larger than the wheels $k$, which compensate for the slightly-different distance they have to travel around the outer surface of the flanges $c'$ over and above what the wheels $k$ would travel on the inner surface of the flanges $c'$, and the shafts $i$ and $f$ of said wheels are connected by gears $i'$ and $f'$, of the same size, and upon the shaft $f$ there are larger gears, $e'$, which mesh with the smaller gears, $e$, upon the electrically-rotated shaft $d$. The gears $e$ and $e'$ permit the speed of the shaft $d$ to be slowed down.

Connected to the upper and lower ends of the rocking frames $s$ $s'$ are the pull levers or rods $m$ $m'$, which pass to the respective ends of the car and are connected to hand-levers of any desired construction, the operation of said rods $m$ $m'$ from either end of the car being to swing the rocking frames $s$ $s'$ out of the vertical line, so that the pairs of friction-wheels $h$ and $k$ are caused to grasp or bite the flanges $c'$ $c'$, and by the rotation imparted to them from the electrically-rotated shaft through the gears before named they in turn revolve the flanges $c'$ and wheels $c$ and impart motion to the car and its running-gear, and when the rods $m$ $m'$ are not pulled upon and the rocking frames $s$ $s'$ stand vertically the friction-wheels run free and do not operate upon the flanges $c'$, and any desired brake mechanism can then be applied to the periphery or tread of the wheels $c$ or $b$ to stop the car.

The amount of motion necessary to impart to the rocking frames and the friction-wheels is exceedingly slight, and would not in any case amount to over a quarter of an inch, and will not in any way affect the gears $e\ e'$.

I claim as my invention—

1. The combination, with the frame $a$, a pair of wheels, $b$, the pair of wheels $c$, having flanges $c'$, and an electrically-rotated or motor shaft, of pairs of friction-wheels adapted to grasp the outer and inner peripheries of the flanges $c'$, the rocking frame in which the shafts of said friction-wheels are mounted, gearing connecting said shafts with each other and with the electrically-rotated shaft, and mechanism, substantially as specified, for operating the pairs of friction-wheels for driving the wheels $c$, substantially as and for the purposes set forth.

2. The combination, with the frame $a$, the pair of wheels $b$, the pair of wheels $c$ and their flanges $c'$, and an electrically-rotated motor-shaft, of the shafts $f\ i$, the rocking frames $s\ s'$, forming bearings for said shafts, short shafts by which the rocking frames are pivoted to the frame $a$, pairs of friction-wheels $h\ k$, mounted upon the respective ends of the shafts $f\ i$, and the gears $i'$, $f'$, and $e$, substantially as and for the purposes set forth.

Signed by me this 22d day of June, 1888.

FRANCIS J. WEIS.

Witnesses:
GEO. T PINCKNEY,
HAROLD SERRELL.